United States Patent
Odobetskiy et al.

(10) Patent No.: US 11,907,308 B2
(45) Date of Patent: Feb. 20, 2024

(54) SYSTEM AND METHOD FOR CONTROLLING ACCESS TO SECURE DATA RECORDS IN A WEB BROWSING SESSION

(71) Applicant: The Toronto-Dominion Bank, Toronto (CA)

(72) Inventors: Kyryll Odobetskiy, Waterloo (CA); Daniel Scott Brotherston, Kitchener (CA)

(73) Assignee: The Toronto-Dominion Bank, Toronto (CA)

(*) Notice: Subject to any disclaimer, the term of this patent is extended or adjusted under 35 U.S.C. 154(b) by 0 days.

(21) Appl. No.: 17/157,222

(22) Filed: Jan. 25, 2021

(65) Prior Publication Data
US 2022/0237237 A1    Jul. 28, 2022

(51) Int. Cl.
| | |
|---|---|
| G06F 16/951 | (2019.01) |
| G06Q 40/04 | (2012.01) |
| G06F 3/0482 | (2013.01) |
| G06F 16/955 | (2019.01) |
| G06F 16/9538 | (2019.01) |
| G06F 16/9532 | (2019.01) |

(52) U.S. Cl.
CPC .......... G06F 16/951 (2019.01); G06F 3/0482 (2013.01); G06F 16/955 (2019.01); G06F 16/9532 (2019.01); G06F 16/9538 (2019.01); G06Q 40/04 (2013.01)

(58) Field of Classification Search
CPC .. G06F 16/951; G06F 16/9532; G06F 16/955; G06F 16/9538
See application file for complete search history.

(56) References Cited

U.S. PATENT DOCUMENTS

| | | | |
|---|---|---|---|
| 7,013,325 B1* | 3/2006 | Vivian | G09B 5/00 434/323 |
| 8,046,282 B2 | 10/2011 | West et al. | |
| 8,266,148 B2 | 9/2012 | Guha et al. | |
| 10,019,561 B1* | 7/2018 | Shelton | G06F 21/32 |
| 10,185,989 B2 | 1/2019 | Ritter et al. | |
| 10,628,775 B2 | 4/2020 | Gauthier et al. | |
| 10,721,268 B2 | 7/2020 | Singh et al. | |
| 10,803,522 B2 | 10/2020 | Cohen | |
| 2005/0004852 A1 | 1/2005 | Whitney | |
| 2005/0192888 A1* | 9/2005 | Lennane | G06Q 40/04 705/35 |
| 2009/0172024 A1 | 7/2009 | Hsu et al. | |
| 2010/0332366 A1* | 12/2010 | de Boer | G06Q 40/04 705/37 |

* cited by examiner

Primary Examiner — Kannan Shanmugasundaram
(74) Attorney, Agent, or Firm — Rowand LLP (57) ABSTRACT

A computer-implemented method is disclosed. The method includes: obtaining document data for a first web document; identifying one or more tradeable objects based on performing a contextual scan of webpage content of the first web document; generating supplementary display data associated with the first web document, the supplementary display data including one or more user interface elements for initiating data record access actions in connection with at least one data record associated with the one or more identified tradeable objects; and graphically presenting the supplementary display data with the webpage content of the first web document.

20 Claims, 7 Drawing Sheets

650' type URL

● Live | Market Watch

651 ★

Toronto-Dominion Bank (TD.TO)
73.50 (+ 0.11%)
( Add to Watchlist ) ( Buy )
( Sell ) ( Analyst Research )

660'

Wells Fargo & Company (WFC)
31.72 (- 0.56%)
( Add to Watchlist ) ( Buy )
( Analyst Research )

The Toronto-Dominion Bank ("TD") and Wells Fargo & Company ("Wells Fargo") today announced a definitive agreement, subject to certain closing conditions, for TD to acquire Wells Fargo's Canadian Direct Equipment Finance business.

The acquisition of Wells Fargo's Canadian Direct Equipment Finance business is expected to add scale and capabilities to TD's existing Canadian Equipment Financing business and expand TD's presence in core markets. Wells Fargo's Canadian Direct Equipment Finance's direct origination model is expected to allow TD to better serve a more diverse set of business customers in need of competitive equipment loans, leases, and customized financing services.

GameStop Corp. (GME)
117.07 (+80.08%)
( Add to Watchlist ) ( Buy )
( Analyst Research )

652

Apple Inc. (AAPL)
139.20 (+ 0.07%)
( Add to Watchlist ) ( Buy )
( Sell ) ( Analyst Research )

630

RECENT NEWS
◈ GameStop shares surge 44% in premarket trade    ◈ Federal Reserve to look beyond possible inflation shock
◈ Apple's stock rallies toward another record

SYSTEM AND METHOD FOR CONTROLLING ACCESS TO SECURE DATA RECORDS IN A WEB BROWSING SESSION

TECHNICAL FIELD

The present application relates to data security and, more particularly, to system and methods for controlling access to secure data records in web browsing sessions. The present application also relates to user interfaces and, more particularly, to system and methods for dynamically updating graphical user interfaces for accessing web documents.

BACKGROUND

The Internet enables access to a web of interconnected documents. A web document may contain various different types of content. The content may, for example, be informational, providing a page visitor with content items, such as text, images, videos, etc. for consumption. A web document may embed references to other connected documents and/or specific elements within a document that the visitor can follow. This allows for expanding the scope of available information for the visitor. While traditional types of such references (e.g., hyperlinks, URLs) can expand informational scope, they typically lead to a contextual disconnect from the webpage content itself. For example, when a visitor clicks on a hyperlink in a source document, they may be taken to a connected webpage that is independent of the source document. The connected webpage may present additional information relating to a content item associated with the reference, but generally does not preserve the original context of the source document. In particular, the visitor would have to navigate back to the source document in order to access the original content.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In an aspect, a computing system is disclosed. The computing system includes a processor, a communications module coupled to the processor, and a memory coupled to the processor. The memory stores instructions that, when executed by the processor, configure the processor to: obtain document data of a first web document; identify one or more tradeable objects based on performing a contextual scan of the document data of the first web document; generate supplementary display data associated with the first web document, the supplementary display data including one or more user interface elements for initiating data record access actions in connection with at least one data record associated with the one or more identified tradeable objects; and graphically present the supplementary display data with the webpage content of the first web document.

In some implementations, identifying the one or more tradeable objects may include processing text data of the webpage content to parse identifiers associated with one or more predefined tradeable objects.

In some implementations, the instructions, when executed, may further configure the processor to obtain account data for a trading account associated with a user of the computing system, and the supplementary display data may be generated based on the account data.

In some implementations, the account data may include historical transaction data associated with the trading account.

In some implementations, the account data may include portfolio data for a portfolio of tradeable objects associated with the trading account.

In some implementations, the instructions, when executed, may further configure the processor to prompt for authentication information associated with a trading account, and generating the supplementary display data may include: transmitting, to an account management server, a request to access the trading account, the request including user-inputted authentication information; determining one or more account-related actions for the trading account that require user authentication; and generating user interface elements corresponding to the one or more account-related accounts.

In some implementations, graphically presenting the supplementary display data with the webpage content of the first web document may include providing, for at least one of the identified tradeable objects, a graphical indication of an association between the supplementary display data and content items associated with the identified tradeable object in the webpage content.

In some implementations, the data record access actions may comprise one or more of: requesting execution of a trade order in connection with at least one of the identified tradeable objects; adding at least one of the identified tradeable objects to a watchlist associated with a trading account; and managing profile and account activity data associated with a trading account.

In some implementations, graphically presenting the supplementary display data with the webpage content of the first web document may include displaying the one or more user interface elements concurrently with the webpage content in a web browser.

In some implementations, the instructions, when executed, may further configure the processor to: receive, via an input interface, selection of at least one of the one or more user interface elements; and transmit, to an account management server, a request to execute an account-related action corresponding to the selected user interface element in connection with a trading account.

In another aspect, a computer-implemented method is disclosed. The method includes: obtaining document data of a first web document; identifying one or more tradeable objects based on performing a contextual scan of the document data of the first web document; generating supplementary display data associated with the first web document, the supplementary display data including one or more user interface elements for initiating data record access actions in connection with at least one data record associated with the one or more identified tradeable objects; and graphically presenting the supplementary display data with the webpage content of the first web document.

In another aspect, a non-transitory computer readable storage medium is disclosed. The computer readable storage medium contains instructions thereon that, when executed by a processor, configure the processor to: obtain document data of a first web document; identify one or more tradeable objects based on performing a contextual scan of the document data of the first web document; generate supplementary display data associated with the first web document, the supplementary display data including one or more user interface elements for initiating data record access actions in connection with at least one data record associated with the one or more identified tradeable objects; and graphically present the supplementary display data with the webpage content of the first web document.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "tradeable object" refers to any object which may be traded. A certain quantity of a tradeable object may be bought or sold for a particular price. A tradeable object may include, without limitation, stocks, options, bonds, future contracts, currency, warrants, derivatives, securities, commodities, swaps, interest rate products, index-based products, goods, or a combination thereof. More generally, a tradeable object may include a product listed and/or administered by an exchange or marketplace, a product defined by an entity, a combination of real and synthetic products, or a combination thereof.

The present application relates to resource account management and, more particularly, to methods for controlling access to secure data records associated with resource accounts. A resource account may specify holdings of various types and quantities of resources (e.g., digital assets) for an associated entity, such as a business, individual, etc. By way of example, a resource account for a customer of a financial institution, such as a banking institution, may be associated with a bank account and an investment portfolio (and, more generally, a trading account) that is composed of actual positions held by the customer in various securities.

Account data for resource accounts may be accessed using software (e.g., a web browser) for accessing information on the Web. A web browser retrieves the content of a requested web document (or other resource) and presents the content on a graphical user interface for the web browser. Typically, the web content includes text, images, sounds, videos, animations, etc. encountered as part of the user experience on websites. For visitors of a website, the web content may form the basis for various actions which may be performed via the web browser. For example, a webpage may contain embedded references (e.g., hyperlinks, URLs) to data that a visitor can follow to access connected documents or specific elements within a document. As another example, a webpage may contain multimedia content objects and a visitor may initiate playback of a selected one of the objects.

A web document may, in some cases, contain information which may be relevant for managing or updating account data for resource accounts. In particular, the content of a web document may form the basis for certain account-related actions that a visitor may want to take in connection with their resource account. Web documents are becoming increasingly complex with advances in web development technologies. A web document may, for example, contain content of various different media types (i.e., multipurpose internet mail extensions or MIME types), and a web browser may process the content of the web document based on the MIME type(s).

The complex nature of web documents may often render it difficult for users to recognize the value of information that is presented on a particular document. A visitor to a webpage may not notice certain content items that are positioned on the webpage or they may fail to recognize the significance of one or more of the content items. For example, a website visitor may read text, view images, watch videos, etc. of a webpage without understanding the significance (i.e., significance individually or in combination) or having a mistaken understanding of certain ones of the content items. The visitor may need to perform searches independently of the website (e.g., using a search engine) to ascertain information about the content items or, in some cases, the visitor may miss out entirely on information associated with the content items. If the visitor navigates away from the website to perform an independent search, the context of the source website will generally not be preserved in the presentation of the search results on the user interface (i.e., web browser). Thus, the visitor may either have a deficient understanding of a website's content items or have to perform additional steps that result in a disconnect from the original content of the website. For web documents, providing a user interface that facilitates effective interaction with and enhanced understanding of the content items in real-time represents a technical challenge.

Further technical challenges are involved with managing access to resource accounts in web browsing sessions. A website visitor may determine that certain account-related actions are desirable based on the content of the webpage that the visitor is currently consuming. For example, the visitor may wish to acquire certain resources for their resource account upon consuming information presented on a source webpage. Typically, the visitor may be required to log in to their resource account independently of the source webpage (i.e., via a separate login webpage) and perform the desired actions once logged in to their account. This process poses both a timing delay and information disconnect between the source website and actual performance of the account-related actions. In particular, account-related actions may not be conducted by the visitor directly from a currently displayed web document based on the content of said document.

The present application provides systems and methods for managing web browsing sessions that address some of the aforementioned technical limitations. In an aspect, methods for managing security of access to resource accounts during web browsing sessions are disclosed. More specifically, a browsing enhancement module for web browsers is described. The browsing enhancement module is configured to obtain document data for web documents and perform contextual scanning of the web documents to identify specific content items. In particular, the browsing enhancement module identifies one or more tradeable objects based on performing a scan of the content items of a webpage. The browsing enhancement module generates supplementary display data associated with the web document, where the supplementary display data includes user interface elements for initiating certain actions in connection with the identified tradeable objects. In particular, the user interface elements may correspond to actions which may be taken by a user for one or more data records that are external to the web browser. For example, the actions may comprise account-related actions for interacting with a resource account in connection with the identified tradeable objects. The supplementary display data for a webpage may be determined based, at least in part, on defined access levels associated with the account-related actions and an authentication status of the visitor of the webpage.

In another aspect, user interfaces for accessing web documents are disclosed. A user interface in accordance with disclosed embodiments allows for directly accessing account-related actions based on the content of a currently displayed web document. In particular, the user interface comprises a graphical user interface for providing supplementary display data enabling interaction with content of a web document and initiating account-related actions in real-time based on the document content. For example, the graphical user interface may be configured to display options for initiating account-related actions, based on tradeable objects that are identified in the webpage content, concurrently with display of the content of a webpage. The user interface allows for dynamically updating the display information for the webpage based on the document content, available account-related actions, defined access levels associated with the account-related actions, and an authentication status of the visitor of the webpage.

Figure 1:
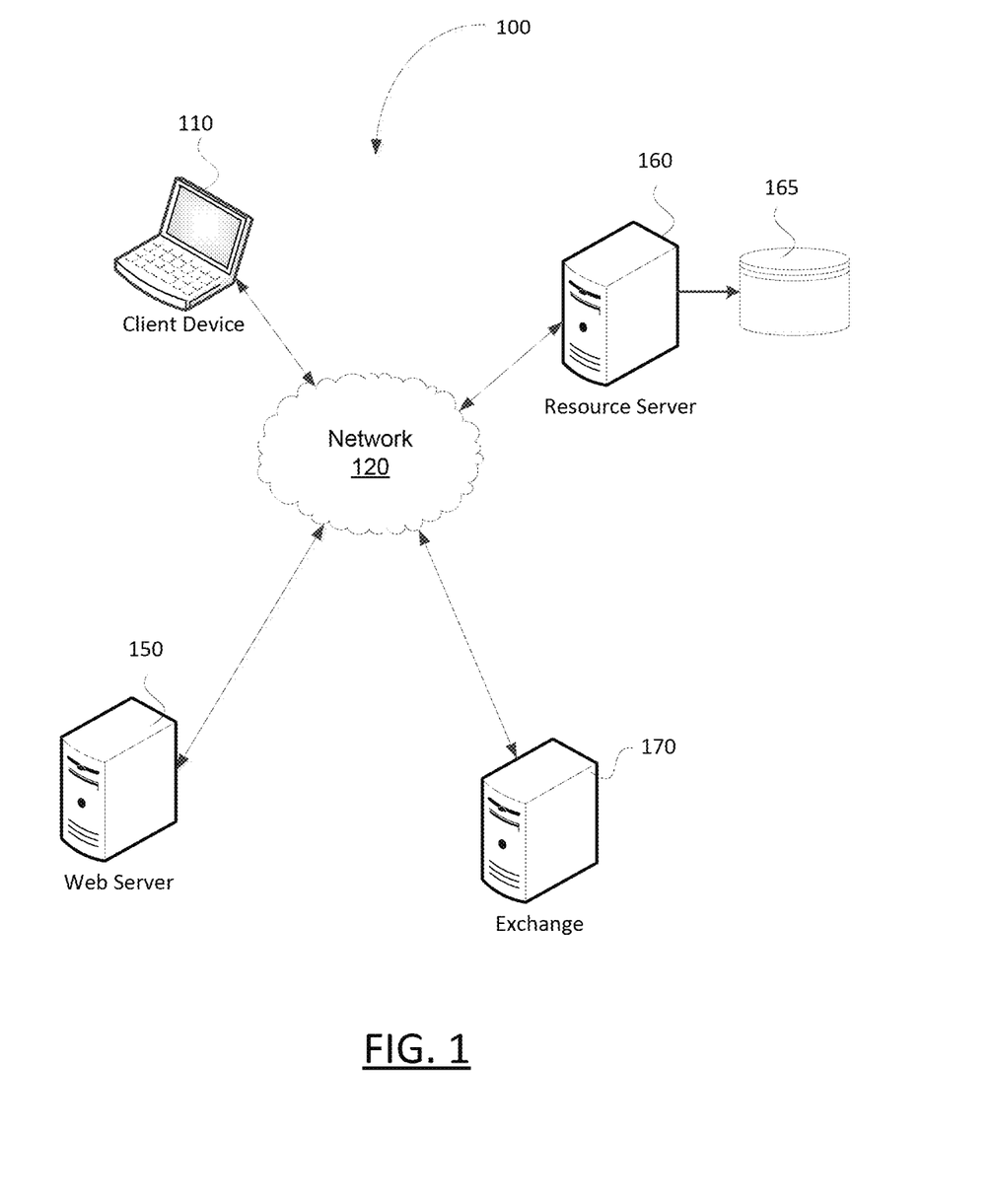
FIG. 1 is a schematic operation diagram illustrating an operating environment of an example embodiment.

Reference is first made to FIG. 1 which illustrates an exemplary networked environment 100 consistent with certain disclosed embodiments. As shown in FIG. 1, the networked environment 100 may include a client device 110, a web server 150, a resource server 160, a database 165 associated with the resource server 160, an exchange 170, and a communications network 120 connecting one or more of the components of networked environment 100.

A resource server 160 (which may also be referred to as a server computer system) and a client device 110 communicate via the network 120. In at least some embodiments, the client device 110 is a computing device. The client device 110 may take a variety of forms including, for example, a mobile communication device such as a smartphone, a tablet computer, a wearable computer such as a head-mounted display or smartwatch, a laptop or desktop computer, or a computing device of another type. The client device 110 is associated with a client entity (e.g., an individual, an organization, etc.) having resources that are managed by or using the resource server 160. For example, the resource server 160 may be a financial institution server and the client entity may be a customer of a financial institution operating the financial institution server. The client device 110 may store software instructions that cause the client device to establish communications with the resource server 160 and, in some embodiments, one or more exchanges 170 that are associated with markets (e.g., stock market, foreign exchange market, etc.).

The resource server 160 may track, manage, and maintain resources, make lending decisions, and/or lend resources to a client entity associated with the client device 110. The resources may, for example, be computing resources, such as memory or processor cycles. In at least some embodiments, the resources may include stored value, such as fiat currency, which may be represented in a database. For example, the resource server 160 may be coupled to a database 165, which may be provided in secure storage. The secure storage may be provided internally within the resource server 160 or externally. The secure storage may, for example, be provided remotely from the resource server 160. For example, the secure storage may include one or more data centers storing data with bank-grade security.

The database 165 may include records for a plurality of accounts and at least some of the records may define a quantity of resources associated with the client entity. For example, the client entity may be associated with an account having one or more records in the database 165. The records may reflect a quantity of stored resources that are associated with the client entity. Such resources may include owned resources and, in at least some embodiments, borrowed resources (e.g., resources available on credit). The quantity of resources that are available to or associated with the client entity may be reflected by a balance defined in an associated record such as, for example, a bank balance.

In at least some embodiments, the database 165 may store various types of information in connection with customers of a business entity that administers the resource server 160. For example, the database 165 may store customer profile data and financial account data associated with customers. The customer profile data may include, without limitation, personal information of registered customers, authentication credentials of the customers, account identifying information (e.g., checking account, savings account, revolving credit line, etc.), and information identifying services (e.g., banking services, investment management services, etc.) and/or programs that are offered to the customers by the business entity. The financial account data may include portfolio data relating to portfolios of investments that are held by customers. A customer's portfolio data may include, for example, information identifying actual positions held by the customer in various securities, information identifying a "virtual" portfolio composed of simulated positions held by the customer in various securities, and "watch lists" specifying various securities that are monitored by the customer.

The business entity associated with the resource server 160 may provide services that are accessible to the client entity. For example, the business entity may provide account management services, financial transaction services, and investment management services for the client entity. In at least some embodiments, the resource server 160 may be configured to provide a user interface that allows client devices 110 to access some of the services offered by the business entity. By way of example, the resource server 160 may be configured to provide a website or web-based portal which can be accessed via the client devices 110. The website (or portal) may include web content corresponding to various services offered by the business entity, and the resource server 160 may provide the web content for display on the client devices 110. As another example, the resource server 160 may be associated with a software application which may be installed and/or run on the client devices 110. In some embodiments, the resource server 160 may be a backend server associated with software (e.g., mobile app, web application, software module, etc.) which may be accessed on the client device 110. The software may, for example, be a mobile banking or investment management application. A graphical user interface (GUI) associated with the application may present the content corresponding to the services offered by the business entity on a display associated with the client device 110. A customer may interact with the business entity and its service offerings via the GUI of the application.

The web server 150 serves documents (and other resources), which may be in the form of webpages, to the client device 110. The web server 150 may, therefore, function as a website, and may process hypertext transfer protocol (HTTP) requests, serving documents and other resources in response to such requests. An HTTP request may, for example, be issued by an application, such as a web browser, operating on the client device 110. The documents that are served by the web server 150 may include documents of various types including, for example, text-based documents, multimedia documents, videos, and audio files. In at least some embodiments, the documents may be hypertext markup language (HTML) documents.

The web server 150 may be operated by an entity different from an entity operating the resource server 160. The profile(s) stored at the resource server 160 and their associated data may thus be maintained privately at the resource server 160 and not made accessible (e.g., disclosed) to the web server 150. Indeed, as will be described in greater detail below, the supplementary data that is provided by the resource server 160 may be generated based on documents served to the client device 110 from the web server 150, but the resource server 160 provides such supplementary data directly to the client device such that said data is not revealed to the web server 150. In this way, the disclosed embodiments maintain the privacy of user-specific data when generating the supplementary data and protect against access of such data by unauthorized third-parties.

The networked environment 100 also includes an exchange 170. The exchange 170 may be owned, operated, controlled, or used by an exchange entity. The exchange 170 represents a trading platform in which order entry and forwarding, matching of buy and sell orders, and price determination may be performed by a computerized system. In at least some embodiments, the exchange 170 may be an electronic exchange. Orders for tradeable objects (e.g., financial products offered for trading by an exchange) can be placed using the exchange 170. In particular, the exchange 170 may be adapted to receive order messages and match contra-side trade orders to buy and sell tradeable objects.

The resource server 160 is in communication with the exchange 170. In some embodiments, the resource server 160 may be in communication with a gateway that, in turn, is in communication with the exchange 170. The resource server 160 is configured to send instructions to the exchange 170. In particular, the resource server 160 may generate order messages that include trade orders and transmit the order messages to the exchange 170. A trade order may, for example, be a command to place an order to buy or sell a tradeable object, a command to modify or cancel an order, or a combination thereof.

The resource server 160 may generate order messages at the request of an entity, such as a user of client device 110. For example, the user may manually input one or more parameters of a trade order (e.g., order price, quantity, etc.) via the client device 110, and request the resource server 160 to execute the trade order on her behalf. The parameters may be input, for example, using software (e.g., web browser, software module, etc.) operating on the client device 110. Additionally, or alternatively, the resource server 160 may generate order messages based on trade orders that are automatically generated at the resource server 160. In particular, order messages for transmitting to the exchange 170 may be generated based on trade orders which are automatically generated by the resource server 160 in accordance with various embodiments of the methods disclosed in the present application.

The exchange 170 may additionally be adapted to provide market data. For example, the exchange 170 may publish a data feed to subscribing entities, which may include the client devices 110 and/or the resource server 160.

The client device 110, the web server 150, the resource server 160, and the exchange 170 may be in geographically disparate locations. Put differently, the client device 110 may be remote from at least one of the web server 150, the resource server 160, and the exchange 170. As described above, the client device 110, the web server 150, the resource server 160, and the exchange 170 may be computer systems.

The network 120 is a computer network. In some embodiments, the network 120 may be an internetwork such as may be formed of one or more interconnected computer networks. For example, the network 120 may be or include an Ethernet network, an asynchronous transfer mode (ATM) network, a wireless network, or the like.

Figure 2A:
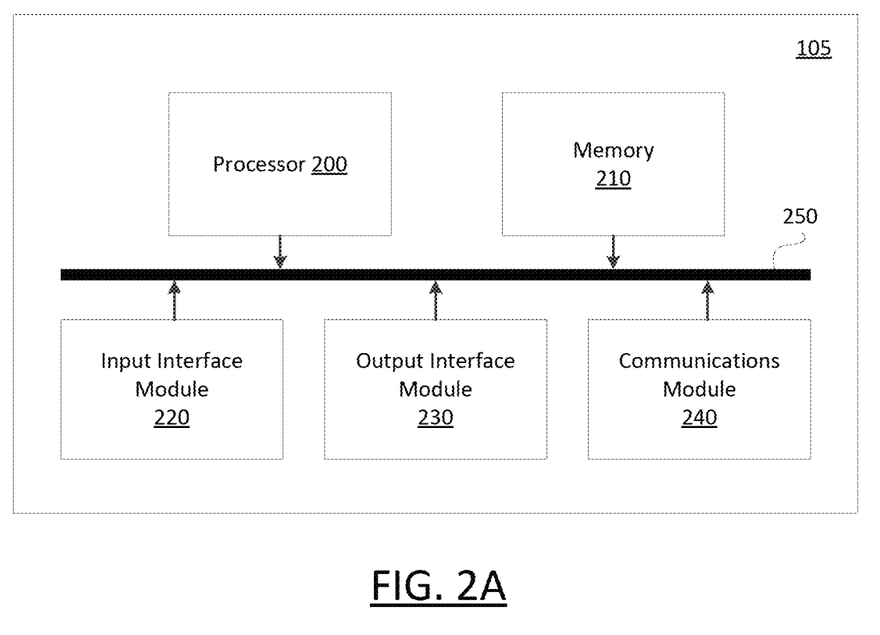
FIG. 2A is a high-level schematic diagram of an example computing device.

FIG. 2A is a high-level operation diagram of an example computing device 105. In some embodiments, the example computing device 105 may be exemplary of one or more of the client device 110, the web server 150, the resource server 160, and the exchange 170. The example computing device 105 includes a variety of modules. For example, as illustrated, the example computing device 105, may include a processor 200, a memory 210, an input interface module 220, an output interface module 230, and a communications module 240. As illustrated, the foregoing example modules of the example computing device 105 are in communication over a bus 250.

The processor 200 is a hardware processor. Processor 200 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 105.

The input interface module 220 allows the example computing device 105 to receive input signals. Input signals may, for example, correspond to input received from a user. The input interface module 220 may serve to interconnect the example computing device 105 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the example computing device 105 to provide output signals. Some output signals may, for example allow provision of output to a user. The output interface module 230 may serve to interconnect the example computing device 105 with one or more output devices. Output signals may be sent to output devices by output interface module 230. Output devices may include, for example, a display screen such as, for example, a liquid crystal display (LCD), a touchscreen display. Additionally, or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the example computing device 105 to communicate with other electronic devices and/or various communications networks. For example, the communications module 240 may allow the example computing device 105 to send or receive communications signals. Communications signals may be sent or received according to one or more protocols or according to one or more standards. For example, the communications module 240 may allow the example computing device 105 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like.

Additionally, or alternatively, the communications module 240 may allow the example computing device 105 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the example computing device 105. For example, the communications module may be integrated into a communications chipset.

Software comprising instructions is executed by the processor 200 from a computer-readable medium. For example, software may be loaded into random-access memory from persistent storage of memory 210. Additionally, or alternatively, instructions may be executed by the processor 200 directly from read-only memory of memory 210.

Figure 2B:
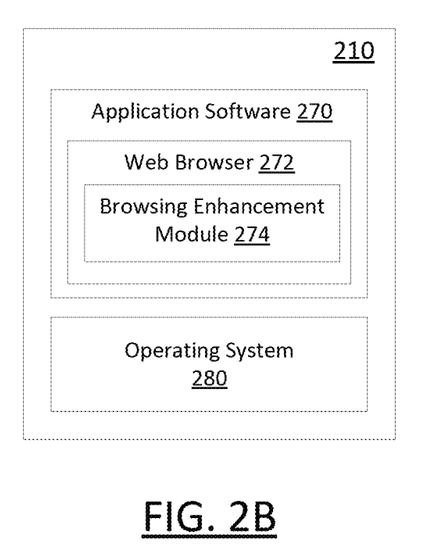
FIG. 2B is a schematic block diagram showing a simplified organization of software components stored in memory of the example computing device of FIG. 2A.

FIG. 2B depicts a simplified organization of software components stored in memory 210 of the example computing device 105. As illustrated these software components include an operating system 280 and application software 270.

The operating system 280 is software. The operating system 280 allows the application software 270 to access the processor 200, the memory 210, the input interface module 220, the output interface module 230, and the communications module 240. The operating system 280 may be, for example, Apple iOS™, Google™ Android™, Linux™, Microsoft™ Windows™, or the like.

The application software 270 adapts the example computing device 105, in combination with the operating system 280, to operate as a device performing particular functions.

The application software 270 may, for example, include a web browser 272. The application software 270 may also include processor-executable instructions which, when executed by the processor 200, cause the computing device 105 to interact with the resource server 160 as described herein. Such instructions are referred to herein as a browsing enhancement module 274. The browsing enhancement module 274 may, for example, be a software module that is provided on the computing device 105 as a plug-in, or extension, of the web browser 272. The browsing enhancement module 274 enables one or more application services to interface with the web browser 272. For example, the browsing enhancement module 274 may add certain features, enable additional actions, and enhance the functionality of websites that are presented using the web browser 272.

The browsing enhancement module 274 is associated with a backend application server. In at least some embodiments, a server which manages resource accounts associated with the customers of a business entity, such as resource server 160 of FIG. 1, may also serve as the backend application server for the browsing enhancement module 274. In particular, various functions of the browsing enhancement module 274 may be provided, at least in part, by a resource server associated with a bank institution. That is, the resource server may perform backend services of the browsing enhancement module 274.

Figure 3:
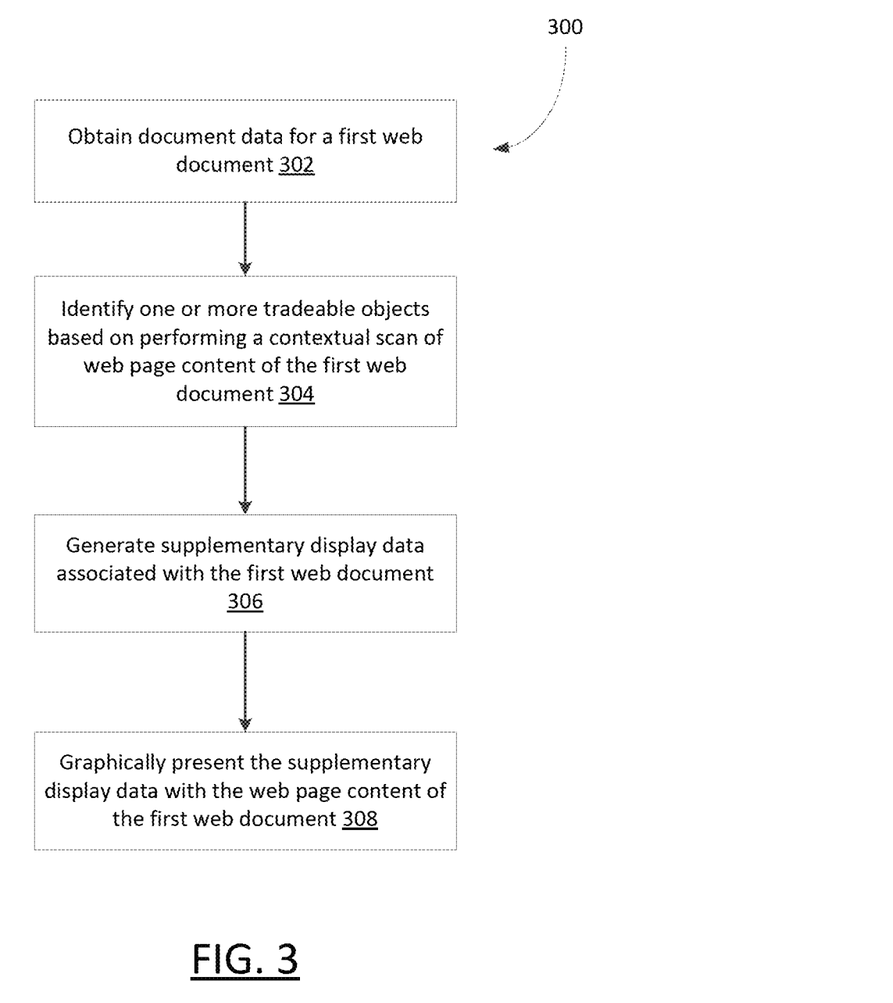
FIG. 3 shows, in flowchart form, an example method for controlling access to secure data records in a web browsing session.

Reference is made to FIG. 3 which shows, in flowchart form, an example method 300 for controlling access to secure data records in a web browsing session. In at least some embodiments, the method 300 may be implemented as part of a process for providing a user interface for accessing web documents on client devices. As a specific and non-limiting example, the method 300 may be implemented in providing users access to account-related actions for resource accounts in a user interface for web documents.

The operations of method 300 may be performed by a client device (e.g., by software resident on the client device), either alone or in conjunction with one or more computer server systems. For example, a client device that is used for a web browsing session may perform one or more client-side operations of method 300 and a server, such as the resource server 160 of FIG. 1, that acts as a backend for a browsing enhancement module of a web browser may perform certain server-side operations of method 300. In some embodiments, a client device or a server may perform all of the operations of method 300. In particular, computer-executable instructions stored in memory of a client device (or a server computer) may, when executed by a processor of the client device (or server), configure the processor to perform the operations of method 300. The instructions corresponding to the operations of method 300 may be executed, for example, as part of software, such as a web browser and/or a browsing enhancement module, that is operable for providing web browsing sessions on the client device.

In operation 302, the processor obtains document data of a first web document. The first web document is a document that is accessible via the Web and may, for example, be an HTML document, a static document (e.g., PDF file), an email message, and the like. The processor may obtain the first web document directly from a web server. For example, the processor may request, via HTTP, to obtain a file that is hosted on a web server (i.e., HTTP request). The web server locates the requested document and sends the document data associated with the document in an HTTP response.

The document data of the first web document includes data identifying the content items contained in the document. In at least some embodiments, the document data may comprise source code (e.g., HTML code) associated with the first web document. The document data includes, for example, metadata about the web document, which may be used by the web browser for displaying content or reloading the document.

In some embodiments, the document data may be obtained in response to one or more trigger events. As explained above, a browsing enhancement module may be enabled to extend the functionalities of a web browser. In particular, a user of the client device may enable a browsing enhancement module in order to access features that are additional to a standard set of features for the web browser. The processor may obtain document data for a web document in response to detecting that the browsing enhancement module has been enabled. For example, the processor may determine that the browsing enhancement module is installed on the client device and receive a user input for enabling the browsing enhancement module. In response to receiving the user input, the processor obtains document data for a first web document.

The first web document may, for example, be a document that is requested to be presented in the web browser. When the processor detects that the browsing enhancement module is enabled, the processor may obtain document data for a document that is requested to be displayed (e.g., a user activates a hyperlink to the document) or a document that is currently being displayed in the web browser. As the web browser retrieves the first web document from a web server and processes the document data (e.g., webpage metadata) for display in the web browser, the processor (in its implementation of the browsing enhancement module) may simply retrieve the document data for the first web document from the web browser.

In operation 304, the processor identifies one or more tradeable objects based on performing a contextual scan of the document data of the first web document. More specifically, the processor performs a scan of the content items of the first web document and identifies one or more tradeable objects in the webpage content. The contextual scanning may be performed by, for example, a document processing module implemented by the processor. The document processing module may be configured to process various types of web documents and capture specific data from the document's content.

The document processing module may receive, as input, document data for a web document. For example, an HTML file associated with a webpage may be received as input at the document processing module, and the module may perform a contextual analysis based on the text of the HTML file. The document processing module may handle various data processing operations. By way of example, the document processing module may be configured to perform text processing operations, such as tokenization, stemming, feature extraction, etc. on the text of the web document. Additionally, or alternatively, the document processing module may perform image and video data processing operations on multimedia content items contained in a web document. For example, the document processing module may determine the types associated with multimedia content items in the web document and apply defined recognition algorithms for detecting faces, objects, etc. in images/videos contained in the web document.

The document data (e.g., HTML file) for the web document forms the basis for identifying one or more tradeable objects in the content of the document. In at least some embodiments, the processor may perform syntactic analysis on the text of the document to parse identifiers associated with one or more tradeable objects. The processor may access a predefined dictionary of identifiers (e.g., names, symbols, etc.) that are associated with tradeable objects. The dictionary may be derived, for example, based on a database storing information relating to known tradeable objects. The processor may parse identifiers that are associated with known tradeable objects from the document text. For example, the processor may perform textual comparisons between items included in the predefined dictionary and syntactic units (e.g., word, sentence) in the document text.

In at least embodiments, the processor may classify the parsed identifiers to determine whether the identifiers are associated with tradeable objects. For example, the processor may perform textual disambiguation on the parsed identifiers. That is, for each of one or more of the parsed identifiers, the processor may determine which sense of the word (i.e., identifier) is used in the document text. The processor may implement one or more of a variety of techniques for word sense disambiguation, such as dictionary-based methods that use knowledge encoded in lexical resources, supervised machine-learning methods in which a classifier is trained for each distinct word on a corpus of sense-annotated examples, and unsupervised methods that cluster occurrences of words inducing word senses. In some embodiments, the processor may determine one or more domains associated with the first web document. In particular, based on the document data (including the text, metadata, etc.), the processor may identify categories or topics that are represented by the content of the first web document. The identified categories/topics of the first web document may inform the textual disambiguation of the parsed identifiers.

More broadly, the processor may be configured to implement named-entity recognition (NER) techniques for locating and classifying named entities (e.g., organization name, tradeable objects, etc.) that are mentioned in the text of the first web document. For example, the processor may implement a statistical NER system relying on annotated training data or a semi-supervised learning technique such as phrase clustering.

In operation 306, the processor generates supplementary display data associated with the first web document. The supplementary display data includes one or more user interface elements for initiating data record access actions in connection with at least one data record associated with the one or more identified tradeable objects. The user interface elements may, for example, be graphical widgets that support user interaction, such as buttons, labels, check boxes, etc. In at least some embodiments, the at least one data record corresponds to an account associated with a user of the client device. The account may, for example, be a trading account on a platform that allows the user to conduct trading activities, such as trading via an electronic exchange. The supplementary display data may thus facilitate user actions in connection with a trading account.

The processor may then determine a set of actions that are available for the user in connection with the identified tradeable objects. The actions may be generic actions that do not require login to a particular account, or they may be account-related actions. Examples of generic actions include retrieving general information, activating related links, and adding objects to or removing objects from watchlists. For account-related actions, the processor may determine the actions that can be performed by the user for the user's trading account (and more specifically, the data record(s) corresponding to the trading account) in connection with the one or more identified tradeable objects. In particular, the actions may comprise data record access actions for accessing the data records associated with the trading account and related subsequent actions for effecting changes to the trading account. Examples of account-related actions in connection with tradeable objects include, but are not limited to: conducting related analysis and research; requesting execution of trade orders in connection with at least one of the identified tradeable objects; adding at least one of the identified tradeable objects to a watchlist associated with a trading account; removing items from a watchlist; managing profile and account activity data associated with a trading account; and reviewing holdings of tradeable objects. In at least some embodiments, the processor may obtain account data associated with the trading account and the supplementary display data may be generated based, at least in part, on the account data. The account data may, for example, include historical transaction data (e.g., historical trading activity data) associated with the trading account and portfolio data for one or more portfolios of tradeable objects that are associated with the trading account.

For one or more of the available actions, the processor may generate user interface elements that allow for initiating the corresponding actions in connection with the identified tradeable objects. In operation 308, the processor graphically presents the supplementary display data with the webpage content of the first web document. In at least some embodiments, the one or more user interface elements for initiating the data record access actions may be displayed concurrently (i.e., in-line) with the webpage content of the first web document in the web browser. The user interface elements may be rendered, for example, in a defined region of the graphical user interface of the web browser. In particular, a defined region of the graphical user interface may be designated for displaying the supplementary display data. For example, the supplementary display data may be presented in a graphical widget that is displayed concurrently with the webpage content of the first web document. The graphical widget may be a container (e.g., windows, panels, tabs, etc.) that groups the added user interface elements. The user interface elements of the supplementary display data enable the user to perform various actions in connection with the identified tradeable objects directly from the graphical user interface of the web browser.

The processor may, in some embodiments, provide a graphical indication of an association between the supplementary display data and one or more content items associated with the identified tradeable object in the webpage content of the first web document. In particular, the processor may graphically represent connections between the content items associated with the identified tradeable objects in the document and the user interface elements of the supplementary display data. For example, if a user hovers over text corresponding to an identifier (e.g., name, symbol, etc.) associated with a tradeable object, the user interface elements of the supplementary display data that correspond to the tradeable object may be highlighted or otherwise displayed differently from other graphical elements in the supplementary display data.

In at least some embodiments, the supplementary display data may be updated as the display of webpage content of the first web document changes. For example, if the processor detects that a scrolling action results in change in the display of the first web document (e.g., a different portion of the document is displayed), the processor may update the supplementary display data. In particular, the supplementary display data may be generated based only on portions of the first web document that are currently displayed in the graphical user interface of the web browser. The processor may determine the boundaries of a currently displayed portion of the first web document and the supplementary display data may be generated based only on the content items contained within the boundaries. As the displayed portion changes (e.g., due to user input, such as scrolling), the supplementary display data may be dynamically updated to correspond to the newly displayed content.

Figure 4:
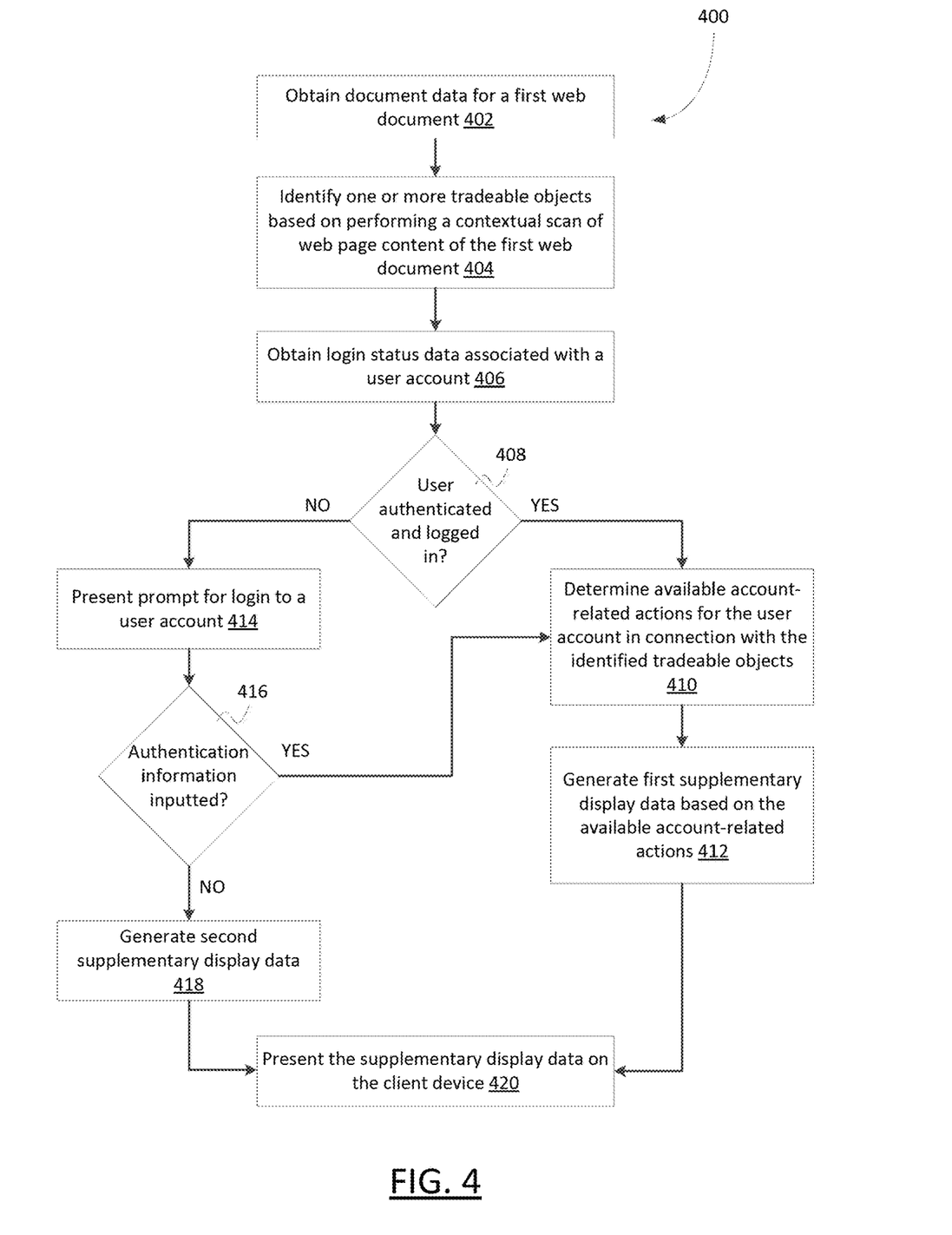
FIG. 4 shows, in flowchart form, another example method for controlling access to secure data records in a web browsing session.

Reference is made to FIG. 4 which shows, in flowchart form, another example method 400 for controlling access to secure data records in a web browsing session. In at least some embodiments, the method 400 may be implemented as part of a process for providing a user interface for accessing web documents on client devices. As a specific and non-limiting example, the method 400 may be implemented in providing users access to account-related actions for resource accounts in a user interface for web documents.

The operations of method 400 may be performed by a client device (e.g., by software resident on the client device), either alone or in conjunction with one or more computer server systems. For example, a client device that is used for a web browsing session may perform one or more client-side operations of method 400 and a server, such as the resource server 160 of FIG. 1, that acts as a backend for a browsing enhancement module of a web browser may perform certain server-side operations of method 400. In particular, computer-executable instructions stored in memory of a client device (or a server computer) may, when executed by a processor of the client device (or server), configure the processor to perform the operations of method 400. The instructions corresponding to the operations of method 400 may be executed, for example, as part of software, such as a web browser and/or a browsing enhancement module. The operations of method 400 may be performed in addition to, or as alternatives of, one or more of the operations of method 300 of FIG. 3.

In operation 402, the processor obtains document data for a first web document. In operation 404, the processor identifies one or more tradeable objects based on performing a contextual scan of the document data of the first web document. Operations 402 and 404 may be performed in a similar manner as operations 302 and 304 of method 300.

In operation 406, the processor obtains login status data associated with a user account. More specifically, the processor determines whether a current user of the web browser is logged in to a trading account on a trading platform. The processor may only check login status for accounts that are associated with one or more of a defined set of trading platforms. In at least some embodiments, the processor may obtain web browsing session data (e.g., browsing history, cookies, cached data, etc.) and determine a login status of the user for an account on a particular trading platform based on the web browsing session data.

In operation 408, the processor determines whether the user is authenticated and logged in to a trading account. If the user is determined to be logged in to an account, the processor determines a set of available account-related actions for the user account in connection with the identified tradeable objects, in operation 410. In at least some embodiments, the set of available actions may include generic actions (e.g., retrieving general information, etc.) in connection with a tradeable object as well as account-related actions that are specific to the user's trading account. The account-related actions may, for example, be actions that require user authentication. In particular, the processor may obtain account settings data for the user's account (e.g., from an account management server for the account), and the available account-related actions may be determined based on the account settings data. The account settings data may indicate various rules, limits (e.g., blacklists), personalization parameters, account information (e.g., available balance), etc. that may affect the determination of which actions may be performed for the trading account in connection with the tradeable object.

Once the set of available account-related actions are determined, the processor generates first supplementary display data based on the available actions, in operation 412. In particular, the first supplementary display data may comprise user interface elements corresponding to one or more of the account-related actions that are determined to be available for the trading account. The first supplementary display data may be presented on the client device in accordance with exemplary embodiments described above.

If, on the other hand, the user is not logged in to a trading account, the processor presents, via the client device, a prompt for login to a user account, in operation 414. For example, a prompt to input authentication information for a trading account may be displayed in the graphical user interface of the web browser. The processor determines whether authentication information is inputted, in operation 416. If no authentication information (or incorrect information) is provided, the processor may generate a second supplementary display data, in operation 418. In particular, the second supplementary display data may include user interface elements corresponding to generic actions, or actions that do not require user authentication to a trading account. For example, the second supplementary display data may comprise a subset of the user interface elements of the first supplementary display data. In some embodiments, the second supplementary display data may include graphical indication of disabled user interface elements. For example, one or more user interface elements may be shown as grayed out. In this way, access to account-related actions requiring user authentication is prohibited.

The first or second supplementary display data, as appropriate, is presented on the client device, in operation 420. In particular, the supplementary display data is displayed in accordance with exemplary embodiments described above.

Figure 5:
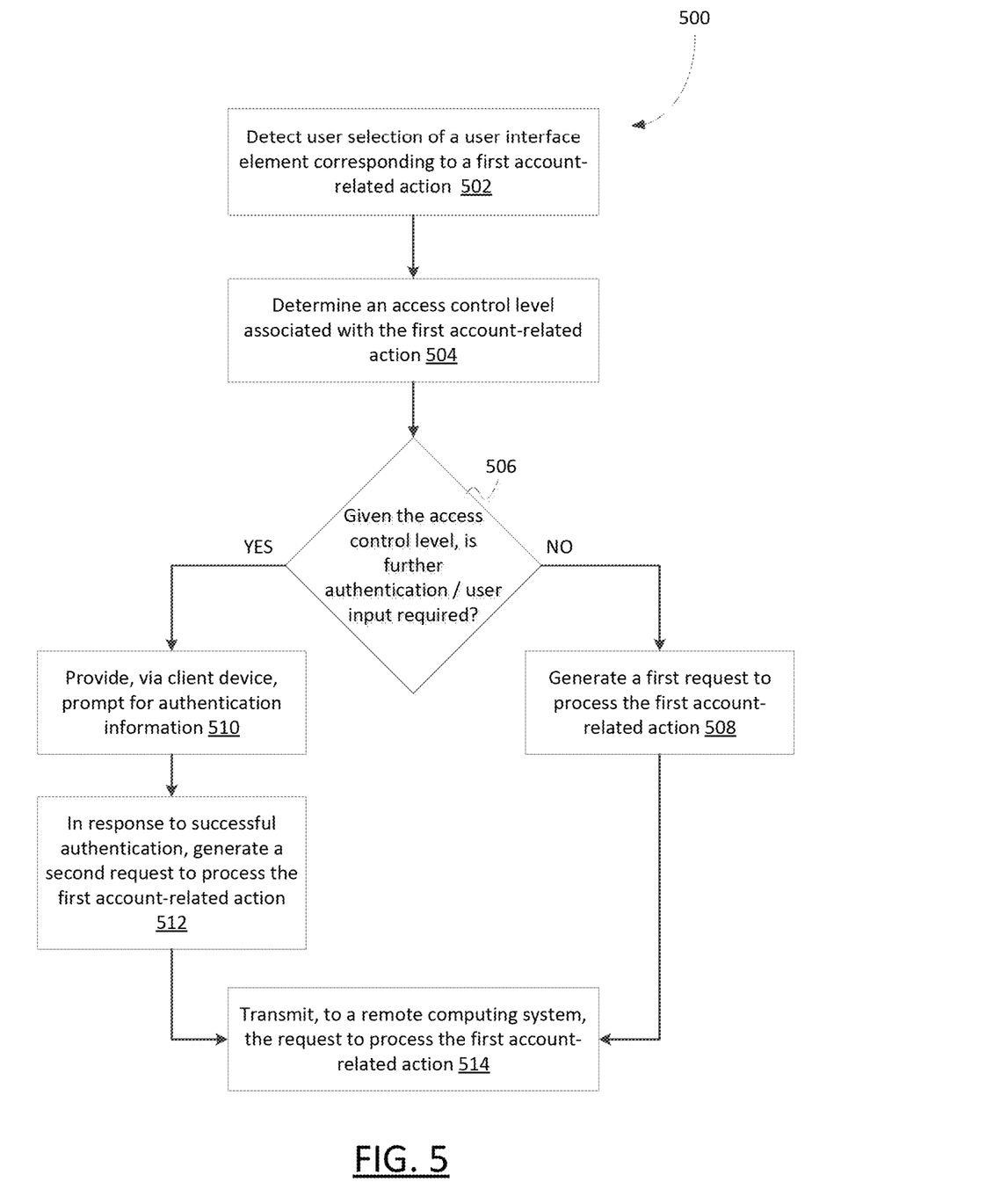
FIG. 5 shows, in flowchart form, an example method for enabling account-related actions from a user interface for presenting content of a web document.

Reference is made to FIG. 5 which shows, in flowchart form, an example method 500 for enabling account-related actions in connection with one or more tradeable objects via a user interface for presenting content of a web document. In at least some embodiments, the method 500 may be implemented as part of a process for providing a user interface for accessing web documents on client devices. As a specific and non-limiting example, the method 500 may be implemented in providing users access to account-related actions for resource accounts in a user interface for web documents. The operations of method 500 may be performed in addition to, or as alternatives of, one or more of the operations of method 300 of FIG. 3 and method 400 of FIG. 4.

As described in exemplary embodiments above, a browsing enhancement module for a web browser may contextually scan the content of a web document and identify one or more tradeable objects based on the scanning. The browsing enhancement module may further be configured to display user interface elements corresponding to actions which may be taken in connection with the identified tradeable objects. The actions may, in at least some embodiments, be account-related actions associated with a user account (e.g., a user's trading account).

The user interface elements allow in-line interaction with a user account in connection with the identified tradeable objects. In operation 502, the processor detects user selection of a user interface element corresponding to a first account-related action. The processor determines, in operation 504, an access control level associated with the first account-related action. In particular, the processor determines the permissions that are required for completing the first account-related action. The various actions which may be taken for a user account, such as a trading account, may have different permission levels. For example, high levels of permission may be required for initiating actions that access sensitive data, modify/update account data for a user account, or involve additional computing systems (e.g., electronic exchange). The processor may query an account management server associated with the user account to determine a permission level associated with the first account-related action.

In operation 506, the processor determines whether further authentication and/or user input is required for initiating the first account-related action, given the access control level associated with said action. If no further input/authentication is required, the processor generates a first request to process the first account-related action in operation 508. For example, if the processor determines that the user has been authenticated and logged in to their trading account, the first request to process the first account-related may be generated. In some embodiments, the first request may include an access token associated with gaining access to the user account. For example, the access token may be used for accessing the user account to update account data associated with the user account. Otherwise, the processor provides a prompt for authentication information in operation 510. In particular, the processor may prompt the user to provide any information that is required for complying with the access control level associated with the first account-related action. For example, a prompt for re-authentication or additional authentication (e.g., authenticating to a different and connected system) may be provided via the client device. In response to successful authentication, the processor generates a second request to process the first account-related action, in operation 512.

The processor transmits, to a remote computing system, the first or second request, as appropriate, to process the first account-related action, in operation 514. In some embodiments, the request may be transmitted to an account management server associated with the user account. The account management server may then route the request to another computing system, such as an exchange.

Figure 6A:
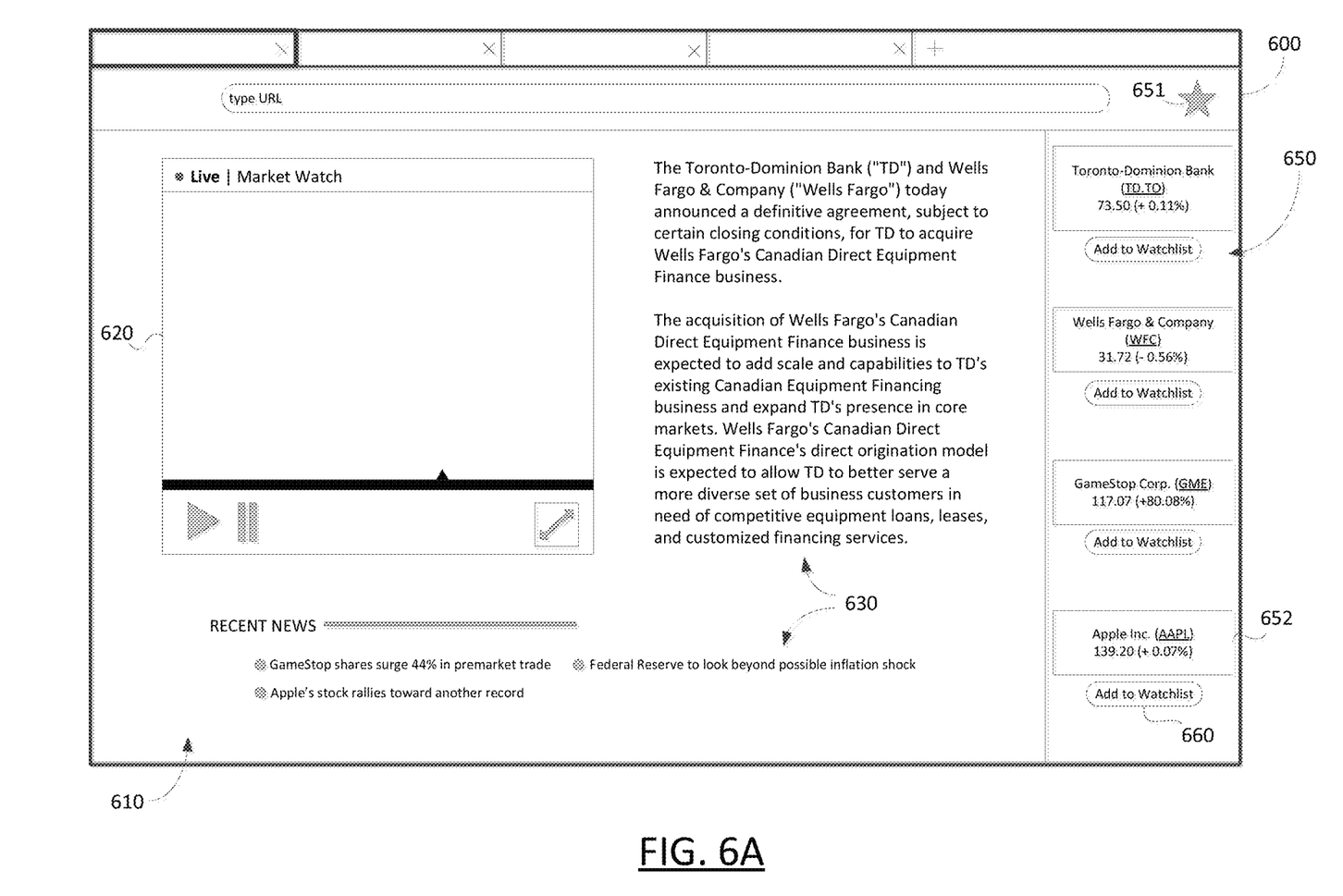
FIG. 6A shows an example of the display area of a browser when a browsing enhancement module in accordance with disclosed embodiments is enabled.

Reference is now made to FIG. 6A which shows an example of the display area of a browser 600 when a browsing enhancement module in accordance with disclosed embodiments is enabled. The browsing enhancement module may be enabled by a user after having navigated to the page 610 or prior to landing on the page 610. In at least some embodiments, the browser 600 may provide a graphical indication that the browsing enhancement module is currently enabled. For example, a user interface element (e.g., icon) may be displayed for indicating that the browsing enhancement module has been enabled.

The browsing enhancement module is configured to scan the content of the page 610. In the example of FIG. 6A, the webpage content includes video data presented in a video player 620 and text data 630. Additionally, or alternatively, the webpage content may include image data, audio data, advertisements, etc. As described above, the browsing enhancement module scans the document data of the webpage and identifies one or more tradeable objects based on the scanning. In at least some embodiments, the tradeable objects may comprise tradeable securities of entities corresponding to names (or identifiers, etc.) that are identified in the document data.

The browsing enhancement module generates supplementary display data for the webpage, which may be displayed concurrently with the document data of the webpage. In the example of FIG. 6A, the supplementary display data generated by the browsing enhancement module is presented in a designated display area 650 of the browser 600. That is, the supplementary display data may be provided in a display area 650 that is distinct from an area containing the webpage content of the page 610. For example, the display area 650 may be a container (e.g., widget) for user interface elements that is displayed upon enabling the browsing enhancement module. As in FIG. 6A, the container may be displayed at a periphery of the page 610.

The display area 650 displays various user interface elements for initiating data record access actions in connection with the identified tradeable objects. In particular, the display area 650 includes display of user interface elements corresponding to actions which may be taken for a user account in connection with the identified tradeable objects. The user interface elements may include, for example, object identifier labels 652 and action labels 660. The object identifier labels 652 provides identifying information (e.g., entity name, ticker symbol, etc.) for the tradeable objects that are identified based on the contextual scan of the webpage. The action labels 660 may be user interface elements which may be actuated to initiate corresponding account actions in connection with the identified tradeable objects.

Figure 6B:
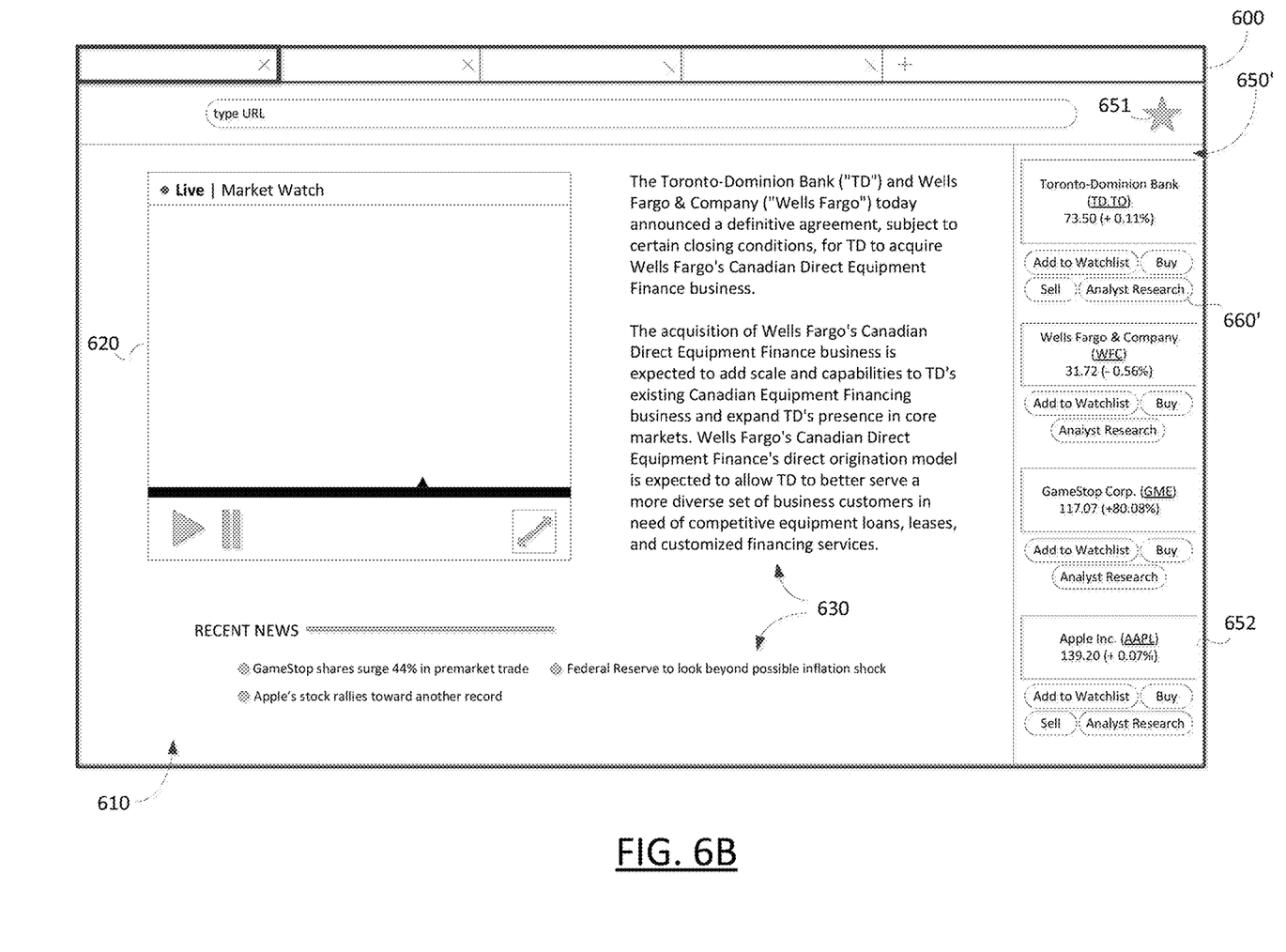
FIG. 6B shows another example of the display area of a browser when a browsing enhancement module in accordance with disclosed embodiments is enabled.

The set of user interface elements that are displayed in the display area by the browsing enhancement module may depend on the available account actions for a user account in connection with the tradeable objects and the access control levels associated with such actions. Reference is made to FIG. 6B which shows another example of the display area of the browser 600. In FIG. 6B, the browser displays the same page 610 but the display area 650' contains user interface elements 660' including one or more additional items when compared to user interface elements 660 of FIG. 6A. In particular, the browsing enhancement module generates supplementary display data that includes additional user interface elements corresponding to account-related actions in connection with the identified tradeable objects. The additional user interface elements may be displayed, for example, when the user re-authenticates or provides additional authentication information for accessing actions that require high levels of permissions, such as buying tradeable objects for a user account, selling tradeable objects from the holdings of a user account, accessing analyst research, etc. The available actions may, in at least some embodiments, depend on current holdings of tradeable objects in a trading account, whitelists or blacklists of tradeable objects associated with the trading account, total amount of available resources (e.g., funds) in the trading account, and the permissions granted to the user with respect to the trading account. The additional items of user interface elements 660' may be displayed only upon user input of authentication information corresponding to the levels of permission required for accessing said items.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing system, comprising:
a processor;
a communications module coupled to the processor; and
a memory coupled to the processor, the memory storing instructions that, when executed, configure the processor to:
  obtain document data of a first web document;
  identify one or more tradeable objects based on performing a contextual scan of the document data of the first web document;
  generate supplementary display data associated with the first web document, the supplementary display data including one or more user interface elements for initiating account access actions in connection with at least one trading account associated with the one or more identified tradeable objects;
  graphically present the supplementary display data with webpage content of the first web document, wherein the graphically presenting the supplementary display data comprises displaying, for each identified tradeable object, only those user interface elements corresponding to available account actions for the tradeable object determined based on permission levels for the account actions and inputted user authentication information;
  detect user selection of a first user interface element corresponding to a first account-related action;
  determine an access control level associated with performing the first account-related action in connection with a first one of the identified tradeable objects on the first web document;
  determine that the user is logged in to a trading account and that further authentication is required for initiating performance of the first account-related action based on the access control level associated with the first account-related action in connection with the first identified tradeable object on the first web document; and
  responsive to successful further authentication of the user, generate a request to process performance of the first account-related action in connection with the first identified tradeable object on the first web document.

2. The computing system of claim 1, wherein identifying the one or more tradeable objects comprises processing text data of the webpage content to parse identifiers associated with one or more predefined tradeable objects.

3. The computing system of claim 1, wherein the instructions, when executed, further configure the processor to obtain account data for a trading account associated with a user of the computing system, and wherein the supplementary display data is generated based on the account data.

4. The computing system of claim 3, wherein the account data comprises historical transaction data associated with the trading account.

5. The computing system of claim 3, wherein the account data comprises portfolio data for a portfolio of tradeable objects associated with the trading account.

6. The computing system of claim 1, wherein the instructions, when executed, further configure the processor to prompt for authentication information associated with the trading account, and wherein generating the supplementary display data comprises:
   transmitting, to an account management server, a request to access the trading account, the request including user-inputted authentication information;
   determining one or more account-related actions for the trading account that require user authentication; and
   generating user interface elements corresponding to the one or more account-related accounts.

7. The computing system of claim 1, wherein graphically presenting the supplementary display data with the webpage content of the first web document comprises providing, for at least one of the identified tradeable objects, a graphical indication of an association between the supplementary display data and content items associated with the identified tradeable object in the webpage content.

8. The computing system of claim 1, wherein the account access actions comprise one or more of:
   requesting execution of a trade order in connection with at least one of the identified tradeable objects;
   adding at least one of the identified tradeable objects to a watchlist associated with a trading account; and
   managing profile and account activity data associated with a trading account.

9. The computing system of claim 1, wherein graphically presenting the supplementary display data with the webpage content of the first web document comprises displaying the one or more user interface elements concurrently with the webpage content in a web browser.

10. The computing system of claim 9, wherein the instructions, when executed, further configure the processor to:
   receive, via an input interface, selection of at least one of the one or more user interface elements; and
   transmit, to an account management server, a request to execute an account-related action corresponding to a selected user interface element in connection with a trading account.

11. A computer-implemented method, comprising:
   obtaining document data of a first web document;
   identifying one or more tradeable objects based on performing a contextual scan of the document data of the first web document;
   generating supplementary display data associated with the first web document, the supplementary display data including one or more user interface elements for initiating account access actions in connection with at least one trading account associated with the one or more identified tradeable objects;
   graphically presenting the supplementary display data with webpage content of the first web document, wherein the graphically presenting the supplementary display data comprises displaying, for each identified tradeable object, only those user interface elements corresponding to available account actions for the tradeable object determined based on permission levels for the account actions and inputted user authentication information;
   detecting user selection of a first user interface element corresponding to a first account-related action;
   determining an access control level associated with performing the first account-related action in connection with a first one of the identified tradeable objects on the first web document;
   determining that the user is logged in to a trading account and that further authentication is required for initiating performance of the first account-related action based on the access control level associated with the first account-related action in connection with the first identified tradeable object; and
   responsive to successful further authentication of the user, generating a request to process performance of the first account-related action in connection with the first identified tradeable object.

12. The method of claim 11, wherein identifying the one or more tradeable objects comprises processing text data of the webpage content to parse identifiers associated with one or more predefined tradeable objects.

13. The method of claim 11, further comprising obtaining account data for a trading account, and wherein the supplementary display data is generated based on the account data.

14. The method of claim 13, wherein the account data comprises historical transaction data associated with the trading account.

15. The method of claim 13, wherein the account data comprises portfolio data for a portfolio of tradeable objects associated with the trading account.

16. The method of claim 11, further comprising prompting for authentication information associated with the trading account, wherein generating the supplementary display data comprises:
   transmitting, to an account management server, a request to access the trading account, the request including user-inputted authentication information;
   determining one or more account-related actions for the trading account that require user authentication; and
   generating user interface elements corresponding to the one or more account-related accounts.

17. The method of claim 11, wherein graphically presenting the supplementary display data with the webpage content of the first web document comprises providing, for at least one of the identified tradeable objects, a graphical indication of an association between the supplementary display data and content items associated with the identified tradeable object in the webpage content.

18. The method of claim 11, wherein the account access actions comprise one or more of:
   requesting execution of a trade order in connection with at least one of the identified tradeable objects;
   adding at least one of the identified tradeable objects to a watchlist associated with a trading account; and
   managing profile and account activity data associated with a trading account.

19. The method of claim 11, wherein graphically presenting the supplementary display data with the webpage content of the first web document comprises displaying the one or more user interface elements concurrently with the webpage content in a web browser.

20. The method of claim 19, further comprising:
   receiving, via an input interface, selection of at least one of the one or more user interface elements; and transmitting, to an account management server, a request to execute an account-related action corresponding to a selected user interface element in connection with a trading account.

\* \* \* \* \*